(12) United States Patent
Herman et al.

(10) Patent No.: US 10,457,504 B2
(45) Date of Patent: *Oct. 29, 2019

(54) TRANSPORTABLE RECEIVING AND STORAGE SYSTEM

(71) Applicant: Quickthree Technology, LLC, Yardley, PA (US)

(72) Inventors: Alvin Herman, Saskatoon (CA); Erin Herman, Clavet (CA)

(73) Assignee: Quickthree Technology, LLC, Yardley, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,369

(22) Filed: Jan. 24, 2019

(65) Prior Publication Data

US 2019/0152726 A1    May 23, 2019

Related U.S. Application Data

(63) Continuation of application No. 16/036,441, filed on Jul. 16, 2018, now Pat. No. 10,239,711, which is a
(Continued)

(30) Foreign Application Priority Data

Mar. 24, 2015 (CA) ...................... 2885668

(51) Int. Cl.
*B65G 65/32* (2006.01)
*B65G 47/58* (2006.01)
(Continued)

(52) U.S. Cl.
CPC ........... *B65G 65/32* (2013.01); *B65G 17/126* (2013.01); *B65G 41/00* (2013.01); *B65G 47/58* (2013.01); *B65G 2201/042* (2013.01)

(58) Field of Classification Search
CPC ........ B65G 3/04; B65G 17/126; B65G 17/36; B65G 41/00; B65G 41/001; B65G 41/002;
(Continued)

(56) References Cited

U.S. PATENT DOCUMENTS 3,792,790 A * 2/1974 Brubaker .................. B60P 3/00
414/332
4,187,047 A   2/1980 Squifflet, Sr.
(Continued)

FOREIGN PATENT DOCUMENTS

CA         2795055 A1    5/2014

*Primary Examiner* — Gene O Crawford
*Assistant Examiner* — Keith R Campbell
(74) *Attorney, Agent, or Firm* — Sheehan Phinney Bass & Green PA

(57) ABSTRACT

A system has a surge bin, a distribution conveyor assembly, an elevating conveyor assembly, and a receiving conveyor assembly. The surge bin has an internal storage compartment, a top input opening, and a bottom output opening. The distribution conveyor assembly has a distribution frame attached at an input end thereof to an upper portion of the surge bin, and a distribution conveyor mounted on the distribution frame. The elevating conveyor assembly has an elevating conveyor configured to receive granular material at an elevating input and discharge the received granular material selectively to the top input opening of the surge bin or to the distribution conveyor input. The receiving conveyor assembly has a receiving station configured to receive granular material from a discharge of a transport vehicle, and a receiving conveyor operative to transfer the received granular material from the receiving station into the elevating input.

30 Claims, 4 Drawing Sheets

Related U.S. Application Data continuation of application No. 15/079,277, filed on Mar. 24, 2016, now Pat. No. 10,065,814.

(51) Int. Cl.
*B65G 17/12* (2006.01)
*B65G 41/00* (2006.01)

(58) Field of Classification Search
CPC .... B65G 41/003; B65G 41/005; B65G 47/58; B65G 65/30; B65G 65/32; B65G 2201/042; B65D 88/12; B65D 88/30; B65D 88/32; B65D 88/54; B65D 88/546
See application file for complete search history.

(56) References Cited

U.S. PATENT DOCUMENTS

| | | | |
|---|---|---|---|
| 4,249,351 A | 2/1981 | Brock | |
| 4,561,821 A | 12/1985 | Dillman | |
| 9,663,303 B2 | 5/2017 | Waldner et al. | |
| 9,752,389 B2 | 9/2017 | Pham et al. | |
| 10,065,814 B2* | 9/2018 | Herman | B65G 17/126 |
| 10,239,711 B2* | 3/2019 | Herman | B65G 17/126 |
| 2013/0142601 A1 | 6/2013 | McIver et al. | |
| 2014/0044508 A1* | 2/2014 | Luharuka | E21B 15/00 414/293 |
| 2014/0377042 A1* | 12/2014 | McMahon | B65G 63/008 414/293 |
| 2015/0044004 A1* | 2/2015 | Pham | B65D 88/32 414/332 |
| 2015/0368036 A1 | 12/2015 | Bromley et al. | |
| 2016/0221761 A1 | 8/2016 | Walder et al. | |
| 2016/0244268 A1 | 8/2016 | Ritter | |
| 2016/0280467 A1 | 9/2016 | Herman | |
| 2017/0130808 A1 | 5/2017 | Pham | |

\* cited by examiner

US 10,457,504 B2

TRANSPORTABLE RECEIVING AND STORAGE SYSTEM

CROSS-REFERENCE TO RELATED APPLICATION(S)

The present application is a continuation application of co-pending U.S. patent application Ser. No. 16/036,441, entitled Transportable Receiving And Storage System, which was filed on Jul. 16, 2018 and is a continuation of U.S. patent application Ser. No. 15/079,277, entitled Transportable Receiving and Storage System with Redundancy, which was filed on Mar. 24, 2016, and which claimed priority to Canadian Patent Application No. 2885668, also entitled Transportable Receiving and Storage System with Redundancy, which was filed on Mar. 24, 2015. The disclosures in the prior applications are incorporated by reference, herein, in their entireties.

FIELD

This disclosure relates to the field of material handling and in particular a transportable system for receiving and storing granular material.

BACKGROUND

In industries such as oil and gas formation fracturing operations large quantities of bulk granular material must be temporarily stored at a work site. In oil and gas fracking operations underground formations are fractured by injecting very large volumes of a slurry of water, frac sand, and various chemicals at high pressure into the formation. Such fracking operations can require very large amounts of frac sand, which must be gathered and stored in temporary facilities set up at the work site. Such fracking operations can require on site storage of thousands of tons of frac sand, as well as corresponding large quantities of water.

Such temporary work sites require a large volume of granular material storage with conveyors for transferring the granular material from transport vehicle into storage bins and then from the bins to a use location. An example of such a storage and handling system is disclosed for example in United States Published Patent Application Number 2013/0142,601 of McIver et al. and Canadian Patent Application Number 2,795,055 of the present inventor Herman.

SUMMARY

The present disclosure provides a transportable system for receiving and storing granular material that overcomes problems in the prior art.

Once a fracking operation has begun, it is necessary to keep the high pressure flow of the slurry flowing until the operation is complete.

The present disclosure provides a transportable system for receiving, storing, and distributing granular material. The system comprises an elongate surge bin with a middle wall dividing an interior of the surge bin into first and second storage compartments with corresponding first and second top input openings and first and second bottom output openings, the surge bin configured to be transported in a horizontal orientation and raised to a vertically oriented operating position at a work site. A distribution conveyor assembly comprises a distribution frame with an input end and an output end, the distribution frame pivotally attached at the input end thereof to an upper portion of the surge bin. A distribution frame actuator is operative to pivot the distribution frame from a transport position extending downward along a wall of the surge bin to an operating position extending laterally from the upper portion of the surge bin, and operative, when the distribution frame is in the operating position, to pivot the distribution frame about a substantially vertical frame pivot axis and about a substantially horizontal frame pivot axis. First and second distribution conveyors are mounted on the distribution frame such that corresponding first and second distribution conveyor inputs are adjacent to the input end of the distribution frame and corresponding first and second distribution conveyor outputs are adjacent to the output end of the distribution frame and adjacent to each other. An elevating conveyor assembly comprises a first elevating conveyor operative to receive granular material at a first elevating input and discharge the received granular material selectively into any one of the first top input opening, the second top input opening, the first distribution conveyor input, and the second distribution conveyor input and a second elevating conveyor operative to receive granular material at a second elevating input and discharge the received granular material selectively into any one of the first top input opening, the second top input opening, the first distribution conveyor input, and the second distribution conveyor input. The elevating conveyor assembly is configured to be transported in a horizontal orientation and raised to an operating position attached to a side of the surge bin opposite the distribution conveyor assembly and supported on a base of the surge bin. A receiving conveyor assembly comprises a first receiving station configured to receive granular material from a discharge of a first transport vehicle and a second receiving station configured to receive granular material from a discharge of a second transport vehicle at the same time the first receiving station is receiving granular material from the discharge of the first transport vehicle. A first receiving conveyor is operative to transfer granular material from the first receiving station selectively into either one of the first and second elevating inputs, and a second receiving conveyor is operative to transfer granular material from the second receiving station selectively into either one of the first and second elevating inputs. The receiving conveyor assembly is configured to be transported to the work site on wheels and attached to the elevating conveyor assembly in an operating position. A surge bin output diverter assembly is operative to selectively receive granular material from either one of the first and second bottom output openings of the surge bin and direct the received granular material into either one of the first and second elevating inputs.

The disclosed transportable system for receiving, storing, and distributing granular material provides redundancy such that receiving, storing and distributing granular material can continue at a reduced rate in the event of a failure of one of the conveyors. The risk that continuous operations such as fracking might be interrupted is reduced. The surge bin, elevating conveyor assembly, receiving conveyor assembly can be supported on one another and engaged together to provide increased stability and resist wind forces and the like which can be significant on such tall structures.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION

Figure 1:
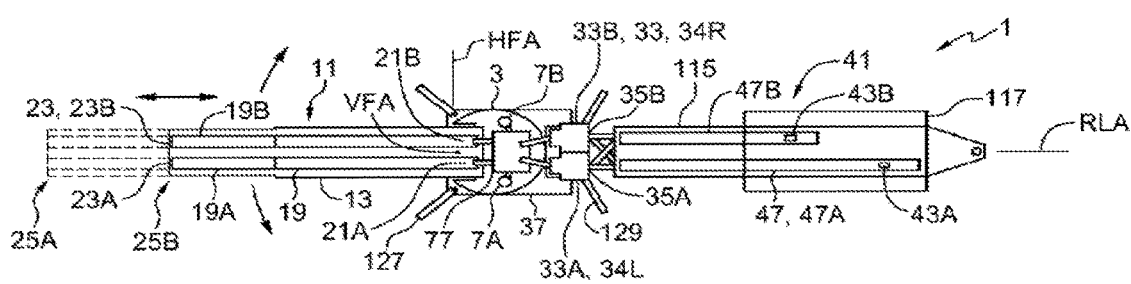
FIG. 1 is a schematic top view of an embodiment of a transportable system of the present disclosure for receiving, storing, and distributing granular material.
Figure 2:
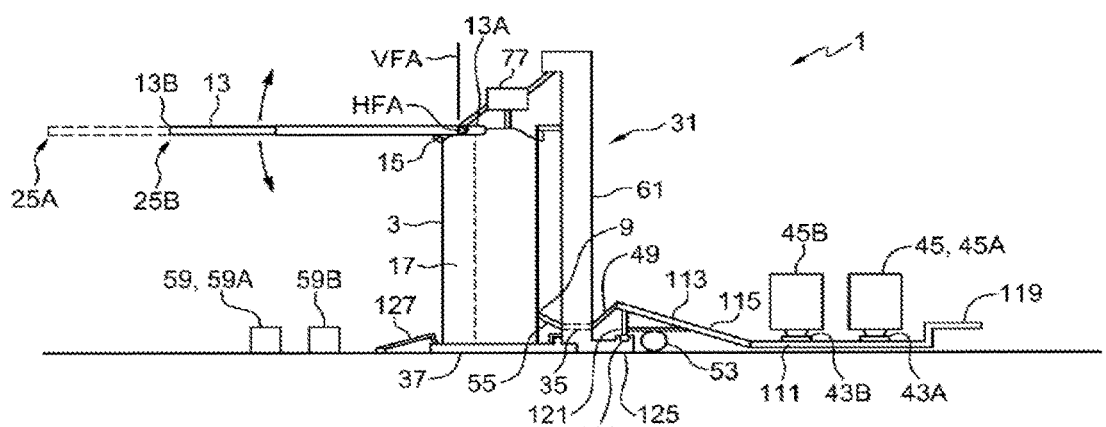
FIG. 2 is a schematic side view of the embodiment of FIG. 1.
Figure 4:
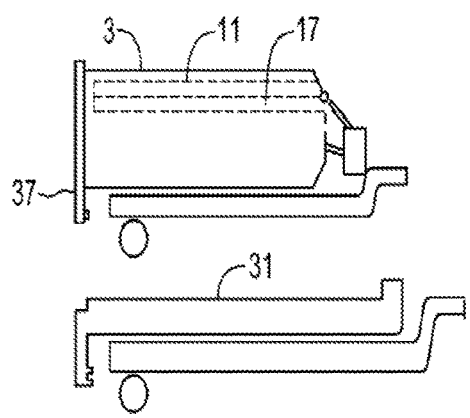
FIG. 4 is a schematic side view of the elevating conveyor assembly and surge tank mounted on trailers for transport to a work site.
Figure 5:
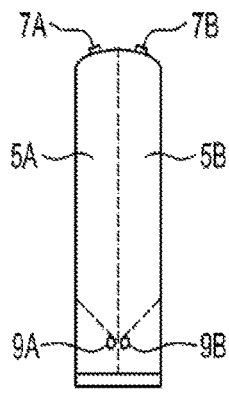
FIG. 5 is a schematic side view of the surge bin of the embodiment of FIG. 1.

FIGS. 1 and 2 schematically illustrate an embodiment of a transportable system 1 of the present disclosure for receiving, storing, and distributing granular material. The system 1 comprises an elongate surge bin 3 with a middle wall dividing an interior of the surge bin into first and second storage compartments 5A, 5B with corresponding first and second top input openings 7A, 7B and first and second bottom output openings 9A, 9B as best seen in FIG. 5. The surge bin 3 is configured to be transported in a horizontal orientation, for example on a trailer as schematically illustrated in FIG. 4, and raised to the vertically oriented operating position shown in FIGS. 1 and 2 at a work site. Providing a surge bin 3 with two separate storage compartments 5A, 5B as schematically illustrated in FIG. 5 allows the system to receive, store, and distribute two different products.

A distribution conveyor assembly 11 comprises a distribution frame 13 with an input end 13A and an output end 13B. The distribution frame 13 is pivotally attached at the input end 13A thereof to an upper portion of the surge bin 3 and a distribution frame actuator 15 is operative to pivot the distribution frame 13 from a transport position shown in FIG. 4 extending downward along a wall of the surge bin 3 to an operating position shown in FIGS. 1 and 2 extending laterally from the upper portion of the surge bin 3. In the illustrated system 1 when in the transport position the distribution conveyor assembly 11 is located in a recess 17 in the wall of the surge bin 3.

When the distribution frame 13 is in the operating position, the distribution frame actuator 15 is operative to pivot the distribution frame about a substantially vertical frame pivot axis VFA and about a substantially horizontal frame pivot axis HFA. First and second distribution conveyors 19A, 19B are mounted on the distribution frame such that corresponding first and second distribution conveyor inputs 21A 21B are adjacent to the input end 13A of the distribution frame 13 and corresponding first and second distribution conveyor outputs 23A, 23B are adjacent to the output end 13B of the distribution frame 13 and adjacent to each other.

Figure 6:
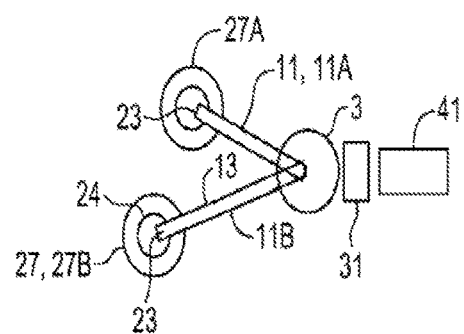
FIG. 6 is a schematic top view of the embodiment of FIG. 1 including first and second storage bins showing how the distribution conveyor assembly can be moved to deposit granular material into such storage bins.

In the illustrated system 1 the distribution frame 13 of the distribution conveyor assembly 11 is extendable such that the distribution conveyor outputs 23 are movable from an inner location 25B, closest to the surge bin 3, to an outer location 25A. In a typical installation the system 1 will further comprise, as schematically illustrated in FIG. 6, first and second storage bins 27A, 27B, and the distribution conveyor assembly 11 is movable from a first storage bin loading position 11A, where the distribution conveyor outputs 23 are oriented to discharge granular material into the first storage bin 27A. Once the outputs 23 are in position the distribution frame actuator 15 is activated to pivot the distribution frame 13 about the horizontal frame pivot axis HFA to lower output end 13B of the distribution frame 13 so it rests on the bin 27A. Resting the distribution frame 13 on the storage bin 27A stabilizes the entire system 1 to resist wind loads.

Figure 7:
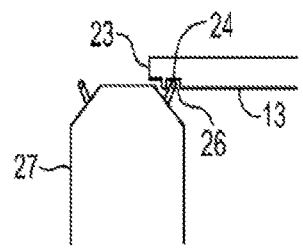
FIG. 7 is a schematic side view showing the distribution frame of the distribution conveyor assembly of the embodiment of FIG. 1 engaged in a lock mechanism to prevent movement of the distribution conveyor assembly with respect to the storage bin being filled.

The distribution conveyor assembly 11 can also be extended as required and raised or lowered to a second storage bin loading position 11B to orient the distribution conveyor outputs 23 to discharge granular material into the second storage bin 27B, and maneuvered to rest on the second bin 27B. As indicated by the arrows in FIGS. 1 and 2 the distribution conveyor assembly 11 can be maneuvered laterally and horizontally to transfer granular material into a significant plurality of storage bins 27. As schematically illustrated in FIG. 7, rather than simply resting on the storage bin 27 the distribution frame 13 can be configured to engage a lock mechanism on the storage bins 27 to prevent movement of the distribution frame 13 with respect to the storage bins 27. The lock mechanism can be provided by a rail 24 mounted to the bin 27 and a recess 26 in a bottom of the distribution frame 13 configured to engage the rail 24.

The system 1 also comprises an elevating conveyor assembly 31 comprising a first elevating conveyor 33A operative to receive granular material at a first elevating input 35A and discharge the received granular material selectively into any one of the first top input opening 7A, the second top input opening 7B, the first distribution conveyor input 21A, and the second distribution conveyor input 21B. A second elevating conveyor 33B is operative to receive granular material at a second elevating input 35B and is also operative to discharge the received granular material selectively into any one of the first top input opening 7A, the second top input opening 7B, the first distribution conveyor input 21A, and the second distribution conveyor input 21B.

The elevating conveyor assembly 31 is configured to be transported in a horizontal orientation, for example on a trailer as schematically illustrated in FIG. 4, and raised to an operating position attached to a side of the surge bin 3 opposite the distribution conveyor assembly 11 and supported on a base 37 of the surge bin 3.

The elevating conveyor assembly 31 is fed by a receiving conveyor assembly 41 comprising a first receiving station 43A configured to receive granular material from a discharge of a first transport vehicle 45A and a second receiving station 43B configured to receive granular material from a discharge of a second transport vehicle 45B at the same time the first receiving station 43A is receiving granular material from the discharge of the first transport vehicle 45A. As seen in FIG. 2 the transport vehicles 45 can be positioned side by side and discharge at the same time.

Figure 8:
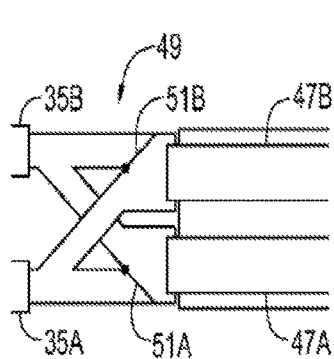
FIG. 8 is a schematic top view of the receiver diverter assembly of the embodiment of FIG. 1.

A first receiving conveyor 47A is operative to transfer granular material from the first receiving station 43A selectively into either one of the first and second elevating inputs 35A, 35B. A second receiving conveyor 47B is operative to transfer granular material from the second receiving station 43A selectively into either one of the first and second elevating inputs 35A, 35B FIG. 8 schematically illustrates a receiver diverter assembly 49 operative to receive granular material from the receiving conveyors 47 and, by moving valve plates 51A, 51B to one side or the other, direct flow from either receiving conveyor 47 into either elevating input 35. The receiving conveyor assembly 41 is configured to be transported to the work site on wheels 53 and attached to the elevating conveyor assembly 31 in the operating position schematically illustrated in FIGS. 1 and 2.

Figure 9:
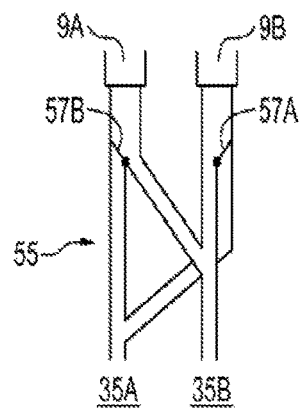
FIG. 9 is a schematic top view of the surge bin output diverter assembly of the embodiment of FIG. 1.

Similarly a surge bin output diverter assembly 55 is schematically illustrated in FIG. 9 and is operative to selectively receive granular material from either one of the first and second bottom output openings 9A, 9B of the surge bin and direct the received granular material into either one of the first and second elevating inputs 35A, 35B by moving valve plates 57A, 57B to one side or the other.

The system 1 thus provides a totally redundant system where a fault with any one of the conveyors 19, 33, 47 still allows movement at half capacity through the system 1. To further ensure redundancy, first and second power sources 59A, 59B are provided, each power source 59 operative to power the distribution frame actuator 15, at least one of the first and second distribution conveyors 19, at least one of the first and second elevating conveyors 33, and at least one of the first and second receiving conveyors 47 at the same time. Each power source 59 is connectable to power the distribution frame actuator 15, both of the distribution conveyors 19A, 19B, both of the elevating conveyors 33A, 33B, and both of the receiving conveyors 47A, 47B.

The first and second elevating conveyors 33A, 33B of the elevating conveyor assembly 31 are conveniently provided by right and left bucket elevators 34R, 34L that are oriented vertically when in the operating position. Such bucket elevators 34 provide high capacity and since they are oriented vertically when in an operating position they occupy a relatively small area of the work site, an important consideration in some crowded areas where space is limited.

Figure 10:
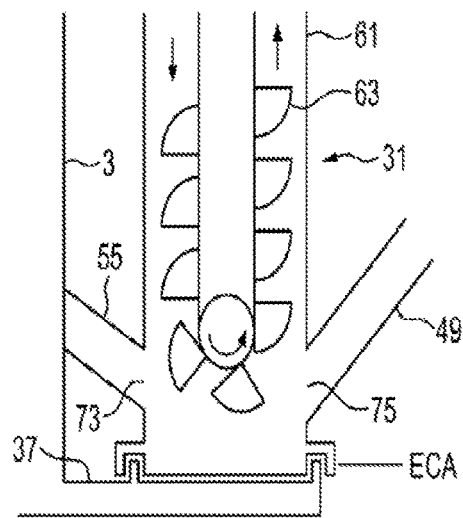
FIG. 10 is a schematic cut away side view of the elevating conveyor assembly of the embodiment of FIG. 1.
Figure 11:
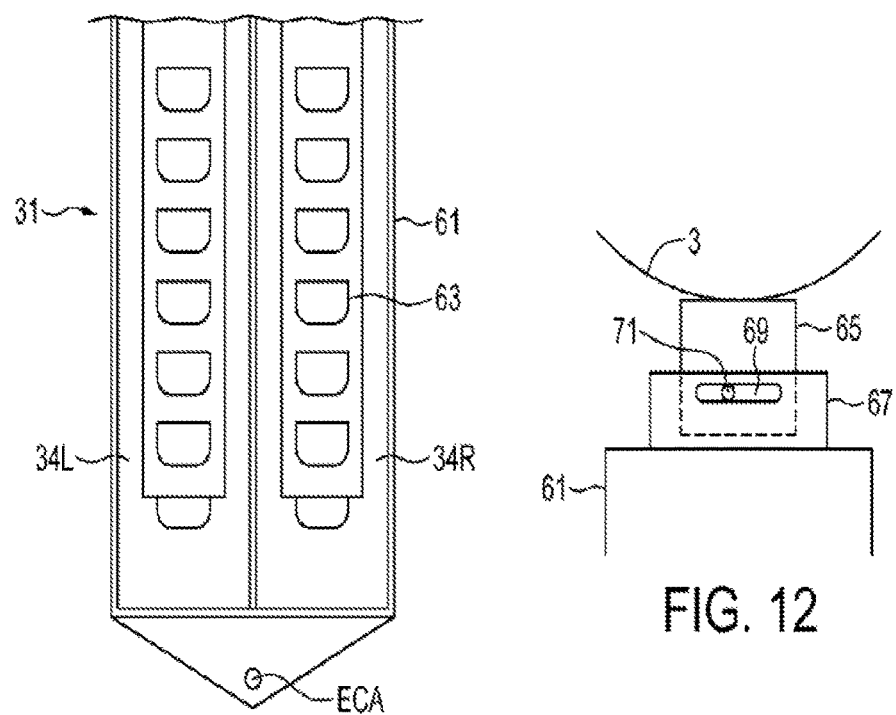
FIG. 11 is a schematic cut away front view of the bucket elevators of the elevating conveyor assembly of the embodiment of FIG. 1.

As schematically illustrated in FIGS. 10 and 11 the right and left bucket elevators 34R, 34L are mounted side by side in an elevator housing 61 with upward moving buckets 63 thereof facing away from the surge bin 3. In order to operate to maximum capacity the bucket elevators 34R, 34L must be oriented vertically so that the buckets 63 are horizontal and will fill to capacity. If the buckets 63 are not horizontal granular material spills out the low side and a lesser amount of material is carried in each bucket 63, reducing capacity.

Figure 12:
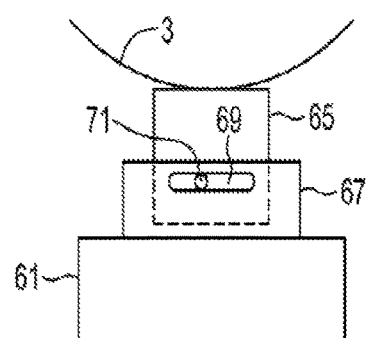
FIG. 12 is a schematic top view of the adjustable attachment mechanism of the embodiment of FIG. 1 for connecting the upper portion of the elevating conveyor assembly to the surge bin.

The elevator housing 61 is supported on the base 37 of the surge bin 3 and is attached at an upper portion thereof to the surge bin 3 by an adjustable attachment mechanism such that the upper portion thereof can be adjusted right and left to ensure that right and left sides of the buckets 63 are at the same vertical level, and thus horizontal for maximum capacity. In the adjustable attachment mechanism schematically illustrated in FIG. 12 a bin plate 65 extends from an upper portion of the surge bin 3 and a bucket plate 67 extends from the elevator housing 61. Slots 69 in the plates 65, 67 allow the housing 61 to be moved right and left as required to achieve the desired vertical orientation and then bolts 71 or like fasteners are tightened to secure the housing 61 to the surge bin 3.

The elevating conveyor assembly 31 can be pivotally mounted on the base 37 about an elevating conveyor axis ECA to facilitate right and left movement of the upper end of the elevating conveyor assembly 31 while adjusting the elevating conveyor assembly 31 to the vertical orientation. Supporting the elevating conveyor assembly 31 on the base 37 of the surge bin 3 adds stability to the system 1 to resist wind loads and like forces.

The elevating input 35 of each bucket elevator 34 is provided by a rear opening 73 in a bottom portion of the elevator housing 61 connected to the surge bin output diverter assembly 55 to receive material from either of the storage compartments 5A, 5B, and a front opening 75 in the bottom portion of the elevator housing 61 is connected to the receiver diverter assembly 49 to receive granular material from the first and second receiving conveyor discharges.

Figure 3:
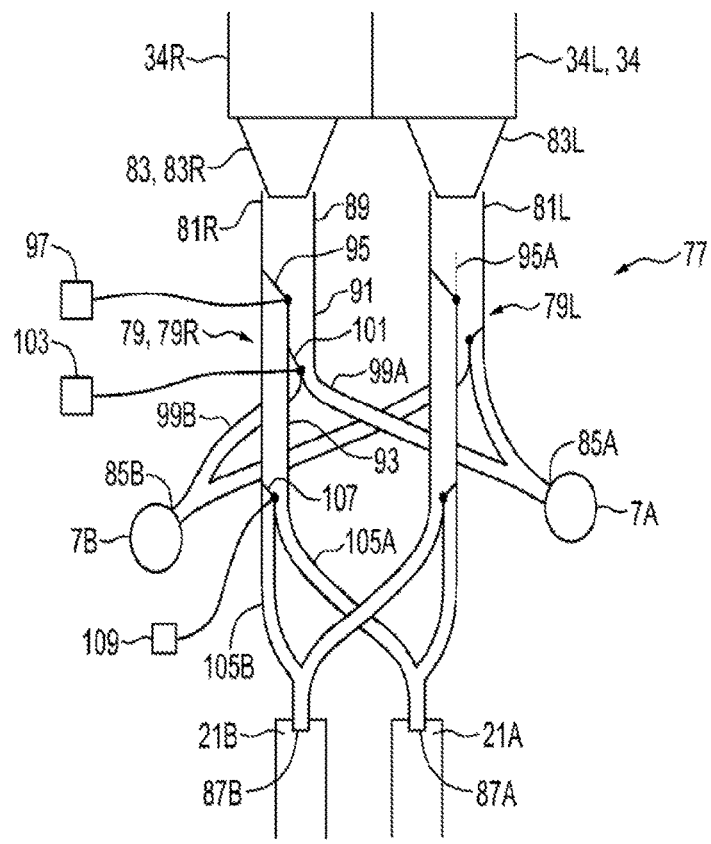
FIG. 3 is schematic cut away top view of the elevating discharge diverter assembly of the embodiment of FIG. 1.

The right and left bucket elevators 34R, 34L discharge into an elevating discharge diverter assembly 77 as schematically illustrated in FIG. 3. The illustrated elevating discharge diverter assembly 77 comprises a right diverter portion 79R with an input end 81R thereof connected to receive granular material from a right discharge 83R of the right bucket elevator 34R, and a left diverter portion 79L with an input end 81L thereof connected to receive granular material from a left discharge 83L of the left bucket elevator 34L.

Each of the right and left diverter portions 79 comprises a first bin diverter output 85A oriented to discharge into the first top input opening 7A of the surge bin 3, a second bin diverter output 85B oriented to discharge into the second top input opening 7B of the surge bin 3, a first conveyor diverter output 87A oriented to discharge into the first distribution conveyor input 21A, and a second conveyor diverter output 87B oriented to discharge into the second distribution conveyor input 21B. A valve mechanism is operative to direct granular material from the input end of the diverter portion to a selected one of the first bin diverter output 85A, the second bin diverter output 85B, the first conveyor diverter output 87A, and the second conveyor diverter output 87B.

In the illustrated elevating discharge diverter assembly 77 each diverter portion 79 comprises a discharge conduit 89 connected at an input end thereof to the discharge 83 of the corresponding bucket elevator 34. A main bin conduit 91 and a main conveyor conduit 93, each has an input end thereof connected to the output end of the discharge conduit 89 through a main valve 95, and a main valve control 97 is operative to move the main valve from a bin position, where granular material flows from the discharge conduit 89 into the main bin conduit 91, to a conveyor position where granular material flows from the discharge conduit 89 into the main conveyor conduit 93.

First and second bin conduits 99A, 99B, each has an input end thereof connected to an output end of the main bin conduit 91 through a bin valve 101, and a bin valve control 103 operative to move the bin valve 101 from a first position, where granular material flows from the main bin conduit 91 through the first bin conduit 99A to the first bin diverter output 85A, to a second position where granular material flows from the main bin conduit 91 through the second bin conduit 99B to the second bin diverter output 85B.

First and second conveyor conduits 105A, 105B, each have an input end thereof connected to an output end of the main conveyor conduit 93 through a conveyor valve 107, and a conveyor valve control 109 is operative to move the conveyor valve 107 from a first position, where granular material flows from the main conveyor conduit 93 through the first conveyor conduit 105A to the first conveyor diverter output 87A, to a second position where granular material flows from the main conveyor conduit 93 through the second conveyor conduit 105B to the second conveyor diverter output 85B.

The elevating discharge diverter assembly 77 thus allows either bucket elevator 34R, 34L to discharge into either top bin opening 7A, 7B or either distribution conveyor input 21A, 21B.

The main valve control 97 can also be operated to put the main valve 95 into an intermediate position 95A such that the main valve 95 proportionately divides the total product flow from the bucket elevator 34 through the discharge conduit 89 between the main bin conduit 91 and the main conveyor conduit 93. Thus a portion of the discharge from the bucket elevator 34 can be directed into either of the storage compartments 5A, 5B of the surge bin 3, and a portion can be directed to either of the distribution conveyors 19A, 19B.

In some applications of the present disclosure it will be desired to transfer granular material from transport vehicles 45 into the storage bins 27 as quickly as possible, The bucket elevators 34 may then have a have a higher capacity than the distribution conveyors 19 and when unloading from the transport vehicles 45 the main valve can be positioned to direct material into the distribution conveyor 19 that is equal to their maximum capacity, while the balance of the discharge from the bucket elevators 34 is directed into the surge bin 3. When one transport vehicle is empty and during the time period while another is moved into position to unload, the bucket elevator 34 can be fed from the surge bin 3 through the surge bin output diverter assembly 55 so that the flow of product on the distribution conveyor 19 can be maintained until the next transport vehicle 45 is in position to unload.

In the illustrated system 1 the first and second receiving conveyors 47A, 47B extend outward from the elevating conveyor assembly 31 in a direction opposite to the surge bin 3 and each comprise, when the receiving conveyor assembly 41 is in the operating position, a horizontal outer portion 111 and an inner inclined portion 113 sloping upward from an inner end of the outer portion 111.

The horizontal outer portions 111 of the receiving conveyors 47 are mounted side by side in a receiver housing 115 that is supported on a ground surface when in the operating position, and comprising ramps 117 on each side of the receiver housing 115. The ramps 117 are configured to enable the transport vehicles 45 to drive over the receiver housing 115 in a direction substantially perpendicular to a longitudinal axis RLA of the receiver housing 115.

The receiver housing 115 defines a first opening above the first receiving conveyor 47A to provide the first receiving station 43A, and a second opening above the second receiving conveyor 47B to provide the second receiving station 43B. The first and second receiving stations 43A, 43B are spaced along the receiver housing 115 such that the first and second transport vehicles 45A, 45B discharge into the corresponding first and second receiver stations 43A, 43B at the same time.

The inclined inner portions 113 of the receiving conveyors 47 are mounted in the receiver housing 115, and the receiving conveyor assembly 41 comprises a plurality of wheels 53 rotatably mounted thereto under the inclined inner portions 113 of the receiving conveyors 47. The wheels 53 are oriented to roll in a direction substantially aligned with the longitudinal axis RLA of the receiver housing 115, and a hitch assembly 119 on the outer end of the receiver housing 115 is adapted for attachment to a towing vehicle to tow the receiving conveyor assembly 41 in a forward direction supported on the wheels 53.

The receiving conveyor assembly 41 comprises a connection bar 121 rearward of the wheels 117. The connection bar 121 is configured to engage recesses 123 in a base 125 of the elevating conveyor assembly 31 when the receiving conveyor assembly 41 is in the operating position. When the receiving conveyor assembly 41 is in the operating position, a rear portion of the receiving conveyor assembly 41 is supported on the connection bar 121 and the base 125 of the elevating conveyor assembly 31. Supporting the receiving conveyor assembly on the base of the elevating conveyor assembly 31 adds stability to the system 1 to resist wind loads and like forces.

Stability to resist wind loads and the like is further enhanced by providing stabilizer legs 127 connected to the surge bin 3 and movable from a stored position in proximity to the surge bin for transport to an extended position extending outward from the surge bin 3.

Further stabilizer legs 129 can similarly be movably connected to the elevating conveyor assembly 31 and movable from a stored position in proximity to the elevating conveyor assembly 31 to an extended position extending outward from the elevating conveyor assembly 31.

The disclosed transportable system 1 of the present disclosure for receiving, storing, and distributing granular material provides redundancy such that receiving, storing and distributing granular material can continue at a reduced rate in the event of a failure of one of the conveyors. The system 1 can receive, store, and distribute two different products at substantially the same time if required. The surge bin 3, elevating conveyor assembly 31, receiving conveyor assembly 41 can be supported on one another and engaged or connected together to provide increased stability and resist wind forces and the like which can be significant on such tall structures.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A system comprising:
   a distribution conveyor assembly comprising:
      a distribution frame with an input end and an output end; and
      a distribution conveyor mounted on the distribution frame with a distribution conveyor input adjacent to the input end of the distribution frame and a distribution conveyor output adjacent to the output end of the distribution frame;
   an elevating conveyor assembly comprising an elevating conveyor configured to discharge granular material selectively to a top input opening of a surge bin or to the distribution conveyor input.

2. The system of claim 1, further comprising:
the surge bin, wherein the surge bin comprises an internal storage compartment, the top input opening, and a bottom output opening.

3. The system of claim 1, wherein the surge bin is configured to be transported in a horizontal orientation with the distribution frame in a transport position and is configured to be raised to a vertically oriented operating position at a work site,
wherein the elevating conveyor assembly is configured to be transported in a horizontal orientation and raised to a vertically oriented operating position at a work site.

4. The system of claim 2, further comprising:
a surge bin output diverter assembly operative to receive granular material from the bottom output opening of the surge bin and direct the received granular material into the elevating conveyor assembly.

5. The system of claim 1, wherein the elevating conveyor comprises an elevating conveyor input, wherein the elevating conveyor is configured to receive granular material at the elevating conveyor input.

6. The system of claim 5, wherein the system further comprises:
a receiving conveyor assembly comprising a receiving conveyor operative to transfer the received granular material from a receiving station into the elevating conveyor input.

7. The system of claim 6, wherein the receiving conveyor assembly is attached to a side of the surge bin opposite the distribution conveyor assembly, and supported on a base of the surge bin.

8. The system of claim 6, wherein the receiving station is configured to receive granular material from a discharge of a transport vehicle.

9. The system of claim 1, wherein the distribution conveyor assembly further comprises:
a distribution frame actuator operative to pivot the distribution frame between a first position extending along a wall of the surge bin and a second position extending from an upper portion of the surge bin.

10. The system of claim 9, wherein the distribution frame actuator is further operative such that, when the distribution frame is in an operating position, the distribution frame actuator causes the distribution frame to pivot about a substantially vertical frame pivot axis and/or about a substantially horizontal frame pivot axis.

11. The system of claim 9, further comprising:
a power source operative to power the distribution frame actuator, the distribution conveyor, the elevating conveyor, and a receiving conveyor.

12. The system of claim 1, wherein the elevating conveyor of the elevating conveyor assembly comprises:
an elevator housing; and
a bucket elevator oriented substantially vertically when in an operating position,
wherein the bucket elevator is inside the elevator housing, and operable such that upward moving buckets of the bucket elevator are at a side of the elevator housing away from the surge bin.

13. The system of claim 12, wherein the elevator housing and the surge bin are configured such that the elevator housing is supported on a base of the surge bin and is attached at an upper portion of the elevator housing to the surge bin.

14. The system of claim 13, wherein an input of the elevating conveyor comprises:
a first opening in a bottom portion of the elevator housing, wherein the first opening in the bottom portion of the elevator housing is configurable to receive granular material from a discharge of a receiving conveyor.

15. The system of claim 1, further comprising:
an elevating discharge diverter assembly comprising:
a diverter portion with an input end connected to receive granular material from a discharge of the elevating conveyor assembly,
wherein the diverter portion comprises:
a bin diverter output oriented to discharge into the top input opening of the surge bin; and
a conveyor diverter output oriented to discharge into the distribution conveyor input.

16. The system of claim 15, wherein the diverter portion further comprises:
a valve configuration operative to direct granular material from the input end of the diverter portion toward a selected one of the bin diverter output, and the conveyor diverter output.

17. The system of claim 16, wherein the diverter portion further comprises:
a discharge conduit connecting a discharge of a bucket elevator to the input end of the diverter portion,
a bin conduit and a conveyor conduit, wherein an input end of the bin conduit and an input end of the conveyor conduit are connected to an output end of the discharge conduit through a valve arrangement, and
a valve control operative to switch the valve arrangement between a first configuration, where the valve arrangement directs granular material to flow from the discharge conduit toward the bin conduit, and a second configuration where the valve arrangement directs the granular material to flow from the discharge conduit toward the main conveyor conduit.

18. The system of claim 1, further comprising:
a receiving conveyor,
wherein the receiving conveyor extends outward from the elevating conveyor assembly, and
wherein the receiving conveyor comprises, when in an operating position, a substantially horizontal outer portion and an inner inclined portion sloping upward from an inner end of the outer portion.

19. The system of claim 18, further comprising:
a receiver housing supported on a ground surface when the receiving conveyor is in the operating position,
wherein the horizontal outer portion of the receiving conveyor is in the receiver housing.

20. The system of claim 19, wherein the receiver housing defines an opening above the receiving conveyor to form a receiving station, the receiving station located such that a transport vehicle discharges into the receiving station when unloading.

21. The system of claim 20, wherein the inner inclined portion of the receiving conveyor is mounted in the receiver housing.

22. The system of claim 21, wherein the receiving conveyor assembly comprises:
a connection bar configured to engage recesses in a base of the elevating conveyor assembly, and
wherein, when the connection engages the recesses in the base of the elevating conveyor assembly, a portion of the receiving conveyor assembly is supported on the connection bar and the base of the elevating conveyor assembly.

23. The system of claim 1, further comprising:
  stabilizer legs movable from a stored position in proximity to the surge bin to an extended position.

24. The system of claim 1, wherein the distribution conveyor assembly is extendable such that the distribution conveyor output is movable between:
  a retracted position where a distal end of the distribution conveyor assembly is a first distance from the surge bin, and
  an extended position where the distal end of the distribution conveyor assembly is a second distance from the surge bin,
  wherein the second distance is greater than the first distance.

25. The system of claim 24, further comprising:
  first and second storage bins,
  wherein the distribution conveyor assembly is movable between:
    a first storage bin loading position with the distribution conveyor output oriented to discharge granular material into the first storage bin, and
    a second storage bin loading position with the distribution conveyor output oriented to discharge granular material into the second storage bin.

26. The system of claim 1, wherein the distribution frame is attached at the input end of the distribution frame to an upper portion of the surge bin.

27. The system of claim 1, wherein the elevating conveyor assembly is attached to a side of the surge bin opposite the distribution conveyor assembly and supported on a base of the surge bin.

28. The system of claim 1, further comprising:
  an adjustable leveling device configured to facilitate leveling of the surge bin and a bucket elevator of the elevating conveyor.

29. The system of claim 1, wherein an elevator housing of the elevating conveyor assembly is supported on a base of the surge bin and is attached at an upper portion of the elevator housing to the surge bin by an adjustable attachment mechanism such that the upper portion of the elevator housing is adjustable from right to left to ensure that right and left sides of buckets in the elevating conveyor assembly are at the same vertical level.

30. A system comprising:
  an elevating conveyor assembly comprising an elevating conveyor configured to discharge granular material, at an upper end of the elevating conveyor assembly, selectively to a top input opening of a surge bin or to an input of a distribution conveyor assembly,
  wherein the distribution conveyor assembly comprises a distribution conveyor that extends outwardly from the upper end of the elevating conveyor assembly.

* * * * *